United States Patent [19]

Geiger et al.

[11] 4,155,339

[45] May 22, 1979

[54] APPARATUS FOR DIVERTING AN EXHAUST STREAM

[75] Inventors: Istvan Geiger, Brunswick; Rudolf Krapf, Leimen, both of Fed. Rep. of Germany

[73] Assignee: Volkswagenwerk Aktiengesellschaft, Wolfsburg, Fed. Rep. of Germany

[21] Appl. No.: 888,880

[22] Filed: Mar. 22, 1978

[30] Foreign Application Priority Data

Mar. 23, 1977 [DE] Fed. Rep. of Germany ....... 2712663

[51] Int. Cl.² ............................................. F02M 31/00
[52] U.S. Cl. ......................... 123/122 H; 123/122 AC
[58] Field of Search ....... 123/122 AC, 122 H, 122 A, 123/122 R; 261/145, 144

[56] References Cited

U.S. PATENT DOCUMENTS

| | | | |
|---|---|---|---|
| 1,169,573 | 1/1916 | Schulz | 123/122 H |
| 3,937,197 | 2/1976 | Bihler | 123/122 H |

*Primary Examiner*—Ronald H. Lazarus
*Attorney, Agent, or Firm*—Brumbaugh, Graves, Donohue & Raymond

[57] ABSTRACT

A device is provided for controlling the flow of the exhaust gases of an internal combustion engine in accordance with the operating conditions of the engine. Exhaust gases flowing from the exhaust manifold are routed either directly to the muffler or to a heat exchanger for preheating the intake air/fuel mixture. The device includes an aeromechanical element having a nozzle-like constriction opening into an enlarged passage. A pair of outlets, connected to the muffler and heat exchanger, branch off from the passage following the constriction. The flow of gases is selectively directed through one of the two outlets by means of control line connections in the enlarged passage, which are supplied with either pressure, negative pressure, or both as the means for deflecting the flow.

10 Claims, 4 Drawing Figures

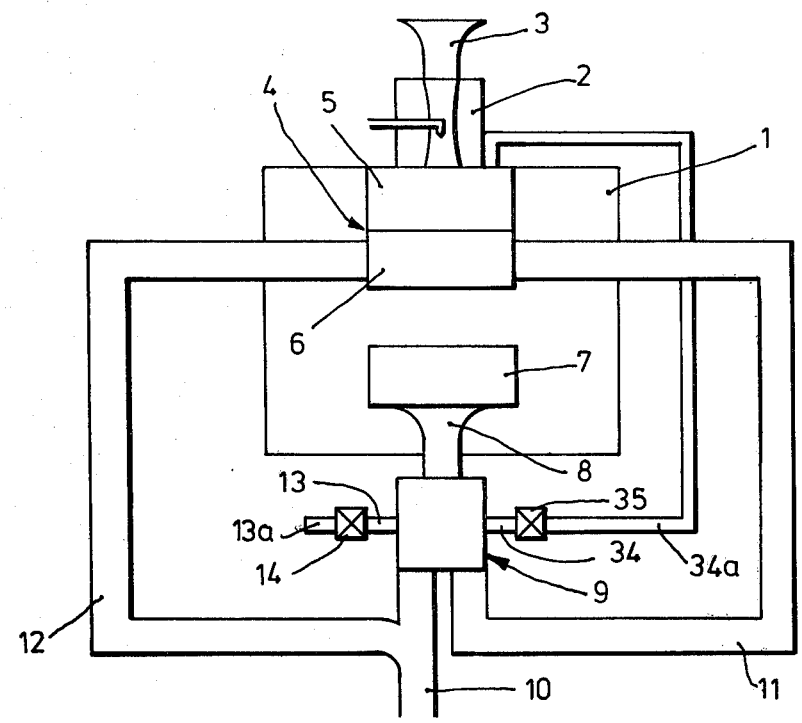
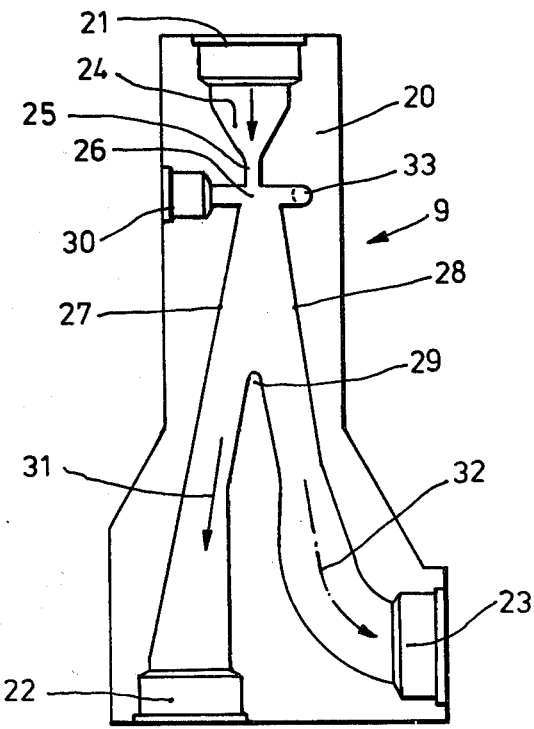
Fig. 2

APPARATUS FOR DIVERTING AN EXHAUST STREAM

BACKGROUND OF THE INVENTION

The invention relates to a device for deflecting a flow of engine exhaust gas, according to the operating condition of the engine, either to one line leading to the atmosphere through the muffler, or to another line directing the flow back through a heat exchanger in the engine to preheat the intake air/fuel mixture, and then out through the muffler to the atmosphere.

In order to improve the performance of an internal combustion engine, especially when the engine is cold, the air fuel mixture in the carburetor may be preheated by means of the exhaust gases leaving the engine. It is not, however, always desirable to preheat the intake mixture. For example, when operating the engine at full load condition, it is desirable to provide the engine with as much fuel as possible. Preheating under this operating condition results in expansion of the intake mixture, which results in less fuel being provided to the cylinder and subsequent power loss.

As a means to control the supply of hot exhaust gases to the heat exchanger, a deflecting flap may be arranged in the exhaust line and positioned to supply exhaust flow either to the heat exchanger or to the muffler, depending upon the operating state of the engine. In such an arrangement, difficulties result because the exhaust, due to its high temperature, is corosive, and it also carries a number of contaminants deriving from the combustion residue. Thus, in order to provide a deflecting flap which will be durable with extended engine use, the flap must be able to withstand these extreme operating conditions, and a refractory and costly material must be used. In addition, special problems arise in mounting the flap, since the bearings may easily be fouled by the contaminants and the actuation of the flap may be impeded or prevented altogether.

SUMMARY OF THE INVENTION

In accordance with this invention, there is provided a device for deflection of the flow of exhaust gases which avoids the above-described disadvantages and is able to withstand extreme temperature exposure to the exhaust gases, and at the same time is simple in design and economical to manufacture.

More specifically, the device according to the present invention has an aeromechanical element having a nozzle-like constriction through which the exhaust flow is directed, followed by an expansion space. Two outlets are arranged on the downstream side of the expansion space which are connected to a first and a second line leading, respectively, to the muffler and back into the engine to a heat exchanger. A pair of control line connections are arranged downstream of the nozzle-like constriction, in the expansion space, for diverting the flow from one outlet to the other. The principle of the exhaust control of this invention derives from characteristic fluid flow tendencies of the exhaust gases. The device operates substantially without moving parts, and utilizes the Coanda effect to control the fluid flow using only control jets of small output. The Coanda effect occurs in the boundary layer of a flowing medium, wherein the fluid jet issuing from a nozzle will follow a neighboring wall and adhere to it. By selecting appropriate geometry of the flow passages, and by providing differential pressuration of the control line connections arranged on the wall adjacent each flow passage, the direction of flow can be controlled on an instantaneous basis with great precision.

In accordance with the preferred embodiment of the invention, the aeromechanical element is a monostable-type with two outlets arranged asymmetrically with respect to the nozzle-like constriction. The outlet preferred by the flow is connected to the line leading directly to the muffler. In order to control the flow in this monostable element, either a control line connection connected to the atmosphere or one connected to a point of excess pressure is provided on the side of the outlet preferred by the flow. Alternatively or jointly, a control line connection capable of being connected to a negative pressure, for example a point of negative pressure on the intake duct of the engine, is provided on the other side of the outlet preferred by the flow. The control line connections may be controlled by valves responding to the operating conditions of the engine and/or a characteristic engine temperature. In this way the control line connections are supplied with atmospheric pressure, excess pressure, or negative pressure as the case may be, dependent upon temperature and/or engine operating conditions, and the deflection of the flow is controlled as desired.

This flow control principle may also be applied to the control of a flow of exhaust by passing the exhaust through a nozzle-like constriction and guiding it into one of two symmetrical outlets by providing pulses of excess pressure to one of the control line connections opening into the expansion space past the nozzle. The flow can be directed selectively through one of two outlets connected in turn to either the muffler or to the heat exchanger, and will continue to flow through that outlet until another pulse is applied diverting the flow into the other outlet.

Other features and advantages of the invention are described below and in more detail with reference to an embodiment of the invention shown by way of the following drawings.

BRIEF DESCRIPTION OF THE DRAWINGS

For the purpose of illustrating a preferred embodiment of the invention, reference is made to the following drawings and detailed description, in which:

FIG. 1 shows a schematic diagram of an internal combustion engine equipped with an exhaust-deflection device according to the invention;

FIG. 2 shows a top view, in cross-section, of a deflection device in the form of a monostable aeromechanical element;

DETAILED DESCRIPTION OF THE PREFERRED EMBODIMENT

Figure 3:
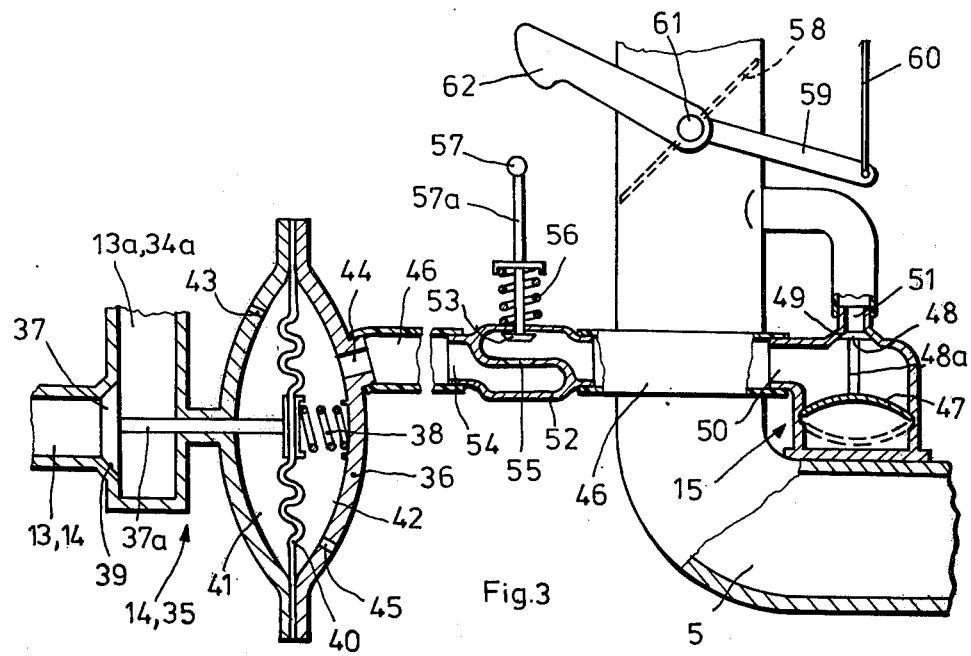
FIG. 3 shows a mechanism for controlling the deflection device in accordance with engine operating conditions.

Referring to FIG. 1, an internal combustion engine 1, for example for a motor vehicle engine, has an air intake 3 for supplying air to a carburetor 2, where fuel is also supplied. The air/fuel mixture is thereafter supplied uniformly to the cylinders of the engine 1 by way of an intake passage 5.

The exhaust formed upon combustion of the engine exits the engine by way of an exhaust passage 7 to an exhaust manifold 8 and thereafter into a deflection device 9, described further below, which delivers the exhaust, depending upon the temperature and operating condition of the engine, either to an exhaust line 10 which is connected directly to the muffler, not here shown, or alternatively to a line 11 which directs the flow through a heat exchanger 4 to preheat the fuel/air mixture as it is flowing through the intake duct 5. In the heat exchanger 4, a system of conduits 6, through which the exhaust flows, is in direct heat exchange with the intake duct 5, or parts thereof, so that the heat contained in the exhaust may preheat the fuel/air mixture. From the heat exchanger 4, the exhaust is returned by line 12 to the exhaust line 10 leading to the muffler.

The deflection means 9, as shown in detail in FIG. 2, is in the form of an aeromechanical element. The aeromechanical element may be a block 20 formed, for example, of temperature-resistant steel. The element has a connection 21 for connecting the flow passage of the block 20 with the manifold 8, and at its other end has a pair of connections 22 and 23 for attaching the exhaust lines 10 and 11. A fourth connection 30 serves as a control line connection for a line designated 13 in FIG. 1, leading to the atmosphere, in which a valve 14 is interposed.

The flow passage formed in the block 20 comprises a constriction 24 and nozzle 25 followed, in the direction of flow, after a sharp edge by an expansion space 26. The expansion space 26 branches off into two passages 31 and 32, leading, respectively, to outlets 22 and 23. The flow divider 29 is arranged more or less on the extended center line of the nozzle 25, however the side walls 27 and 28 of the two passages 31 and 32 are asymmetrical with respect to the center line, inasmuch as the side wall 27 associated with the passage 31 and output 22 is closer to the center line than the side wall 28 associated with the passage 32 and output 23. In this arrangement, the Coanda effect of the flow will result in the exhaust jet, having issued from the nozzle 25, following the wall 27 and thus exiting through passage 31 and output 22 to the muffler, rather than entering the other passage 32. The flow through passage 31, however, can be diverted by providing a slight pressure elevation immediately past the nozzle 25 on the side corresponding to passage 31, or alternatively a pressure reduction on the side corresponding to passage 32. This may be accomplished by opening valve 14 in line 13, so that the control line connection 30 is connected to the atmosphere. The pressure elevation on the side of the preferred passage 31 resulting from the pilot flow, breaks the adhesion of the stream of gas to the wall 27, so that it is deflected over to the wall 28 and adheres thereto for as long as the control line connection is connected to the atmosphere. This same effect can be achieved if, instead of, or in addition to, opening line 13 to the atmosphere, a control line connection 33 is provided with suction on the side of the passage 32, for example by connecting a line 34 to a point of suction in the intake duct 5. A valve 35 may be provided in the line 34 for selectively providing the suction.

The control line connections may be controlled according to a characteristic temperature of the engine, preferably the temperature of the fuel/air mixture passing through the intake passage 5, the valves 14 and/or 35 being open for directing the flow through passage 32 when the intake temperature is below a preselected level, for example below 100° C.

As shown in FIG. 3, this control may be effected by a thermostat mechanism 15. Preferably, a second mechanism 16 is superimposed which, regardless of engine temperature, will cause valves 14 and 35 close if the output of the engine is in the full load range, that is at the full load point or just short it. This second mechanism 16 may be connected with the throttle or gas pedal to detect full load of the engine. During or near full load condition, preheating of the intake duct should be omitted to avoid engine power losses.

To that purpose the control valves 14 and 35 are operated by a vacuum-actuated device 36 comprising a flexible diaphragm 40 to separate a first chamber 41 connected through a bore 43 to the atmosphere and a second chamber 42 connected by a vacuum line 46 to a vacuum source, for example to a point of suction in the intake duct 5 of the engine. The control valves have a valve body 37 which is connected to the diaphragm 40 by a rod 37a and which in the lack of a suction in the second chamber 42 is pressed to its valve seat 39 by means of a spring 38 thereby interrupting the connection between the control lines 13 and 34 and the lines 13a and 34a, leading to the atmosphere and a point of suction, respectively. But if the second chamber 42 is provided with suction, the valve body 37 is lifted from the seat 39 connecting the control lines 13 and 34 to the lines 13a and 34a, respectively.

A bore 45 with a very small diameter in relation to the diameter of the vacuum line 46 connects the second chamber 42 to the atmosphere, thus ventilating the chamber 42 only when the suction is disconnected.

The thermostat mechanism 15, arranged in the vacuum line 46 is fastened to the intake duct 5 and contains a bimetal strip 47 which is exposed to the heat of the intake duct 5. A valve body 48 is connected to the bimetal strip 47 by a rod 48a so that in the warm state of the bimetal strip the valve body is pressed to its seat 49 disconnecting the connections 50 and 51 of the vacuum line 46. If against that the temperature of the intake duct 5 is below a preselected value, for example at cold starting of the engine, the bimetal strip 47 takes a position designated by dotted lines lifting the valve body 48 from the seat 49 and thus providing the vacuum-actuated device 36 with suction.

The second mechanism 16 comprises a valve body 53 which can be actuated by a cam 62 fastened at the shaft 61 of the throttle valve 58, which is arranged in the intake duct 5 of the engine. The throttle valve 58 is actuated by means of a cable 60 connecting an actuating lever 59 of the throttle to an accelerator pedal, not here shown. The cam 62 may be designed so that during or near full opened throttle valve 58, that means during or near full load condition, it presses down the end 57 of the valve rod 57a bearing the valve body 53 against the valve seat 55. In other load conditions the valve spring 56 lifts the valve body 53 thereby connecting the connections 54 and 55 and providing the vacuu-actuated device 36 with suction provided that the thermostat mechanism 15 is opened, too.

The geometry of the flow passages in the monostable type of aeromechanical element previously described is so designed that when the control flow is stopped, the gas jet will swing back to the wall 27 and hence the passage 31.

Figure 4:
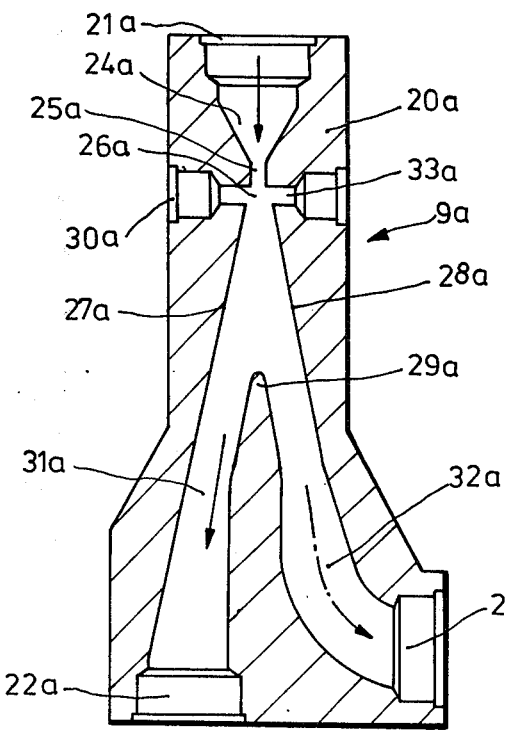
FIG. 4 shows a top view, in cross-section, of another deflection device in the form of a bi-stable aeromechanical element.

In FIG. 4 showing another form of the invention, the elements are identified by numbers corresponding to their counterparts in FIG. 2 supplemented by the subscript "a". The aeromechanical element of FIG. 4 may be formed so that the walls 27a and 28a and the exhaust passages 31a and 32a are symetrical, that is, a bi-stable aeromechanical element. In that case both control lines 30a and 33a are connected, by valves, to the atmosphere or to an excess pressure for switching the exhaust flow from one passage 31a to the other 32a. In the case of a bi-stable aeromechanical element, the flow, once adhering to one of the two walls, 27a and 28a, will continue to adhere to that wall until a new control impulse (excess pressure) from a selected connection 30a or 33a is provided, which will switch the flow to the other wall. In this case, as in the case of a monostable aeromechanical element, the switching impulse may be emitted according to certain characteristic engine temperatures or according to the engine operating condition.

The form of the invention described above is merely illustrative of a preferred embodiment of the invention. Other modifications and variations will be apparent to those skilled in the art, and all such modifications and variations are intended to be within the scope of claims as hereinafter recited.

We claim:

1. In an internal combustion engine a device for directing the exhaust flow of said internal combustion engine from the exhaust manifold of the engine either through a first line passing the flow to the exhaust muffler, or through a second line passing the flow to a heat exchanger for preheating the intake air/fuel mixture and then to the muffler, depending upon the operating conditions of the engine, said device comprising an aeromechanical element having an intake passage, said passage formed at one end to be coupled with said exhaust manifold and at its other end having a nozzle-like constriction, an enlarged passage connected to said intake passage at said constriction, a pair of outlets branching off from said enlarged passage and formed at their outlet ends to be connected to said first line and said second line, respectively, and deflecting means for deflecting the flow from one outlet to the other comprising at least one control line connection arranged in said enlarged passage and means for varying the air pressure at said connection for deflecting said flow.

2. A device according to claim 1, wherein said aeromechanical element is a monostable type, said pair of outlets arranged asymmetrically with respect to said nozzle-like constriction such that the flow exits through the outlet connected with said first line when not deflected by said deflecting means.

3. A device according to claim 2, wherein a control line connection is provided on the side of the outlet connected with said first line, said connection being connected to the atmosphere.

4. A device according to claim 2, wherein a control line connection is connected on the side opposite the outlet connected with said first line and includes means for supplying negative pressure connected with said control line.

5. A device according to claim 3 or 4 wherein the control line connection includes valve means and means for controlling said valve means in accordance with a characteristic engine temperature.

6. A device according to claim 5, wherein there is further provided means for controlling said valve means in accordance with the operation condition of the engine.

7. A device according to claim 5, wherein the means for controlling said valve means comprises first means for maintaining said valve means in an open condition when said characteristic engine temperature is below a predetermined value.

8. A device according to claim 7, wherein said means for controlling said valve means further comprises second means operating on said first means for closing said valve means when the engine is operating in the full-load range.

9. A device according to claim 1, wherein the aeromechanical element is a bi-stable type having two outlets arranged substantially symmetrically with respect to the nozzle-like constriction, wherein there are provided two of said control line connections oppositely disposed in said enlarged passage and means for supplying brief control impulses of pressure selectively to each of said control line connections for diverting the flow from one outlet to the other.

10. A device according to claim 9, further comprising valve means associated with each said control line connection, and means controlling said valve means according to the operating condition and characteristic temperatures of the engine.

* * * * *